A. McKINLEY.
NUT LOCK.
APPLICATION FILED NOV. 10, 1908.
925,496.
Patented June 22, 1909.
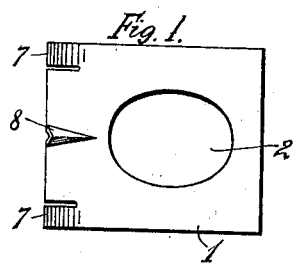
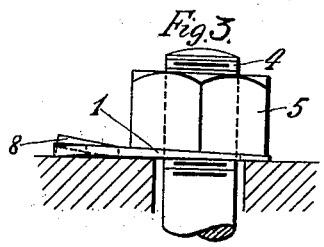
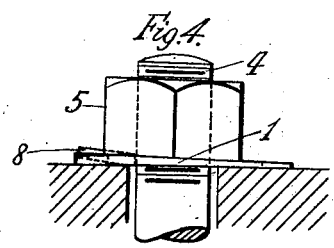
WITNESSES:
INVENTOR,
ANDREW McKINLEY,
by
Attorney.

UNITED STATES PATENT OFFICE.

ANDREW McKINLEY, OF NEW YORK, N. Y.

NUT-LOCK.

No. 925,496.   Specification of Letters Patent.   Patented June 22, 1909.

Application filed November 10, 1908. Serial No. 461,984.

*To all whom it may concern:*

Be it known that I, ANDREW MCKINLEY, a citizen of the United States of America, and resident of New York, N. Y., United States of America, have invented a certain new and useful Improvement in Nut-Locks, of which the following is a specification.

This invention relates to improvements in nut-locks of the kind comprising a wedge shaped washer adapted to be fitted on the bolt before the nut is screwed home. The object of the present invention is to provide a nut-lock of this type which will be more effective in operation than those at present in use.

The improved nut-lock consists of a wedge-formed washer having an elongated orifice, preferably oval, through which the bolt passes; the wedge end of the washer is provided with downwardly-projecting edge tongues which bear against the bearing surface, and the washer is also provided with a ridge or projection on its upper face, at or about the center thereof.

In the accompanying drawing, Figure 1 is a plan of the washer referred to. Fig. 2 is an elevation of this form of washer. Fig. 3 shows the washer under the nut after the nut is screwed home but before the washer is tapped farther under the nut, and Fig. 4 shows the nut-lock in position after being forced under the nut by tapping.

As shown, the nut-lock comprises a wedge-formed washer 1, having an elongated orifice 2, the thick or wedge end provided with down-turned teeth 7, and the ridge or projection 8.

In the use of the improved nut-lock the washer 1 is placed on the projecting part of the bolt stem 4, and the nut 5 is placed above it and then screwed home. The washer is then tapped by a suitable tool at the thick end of the wedge so as to force it under the nut, thus upsetting the said nut on the thread and thereby locking it on the bolt. The forcing of the washer under the bolt by tapping, causes the down-turned teeth 7 to bite into the bearing surface. Said down-turned teeth, at the wedge end, serve to prevent the washer from backing off and act as springs to take up any wear or any difference in expansion or contraction. The ridge 8 serves to engage with the nut when the washer is driven under it, and also tends to prevent the nut from turning.

Having thus described my invention what I claim and desire to secure by Letters Patent of the United States is:—

A washer for a nut-lock, consisting of a wedge-shaped plate having an elongated orifice therethrough, said plate being provided with downwardly projecting elastic edge tongues and also with a ridge upon its upper face.

In testimony whereof I have signed my name to this specification in the presence of two subscribing witnesses.

ANDREW McKINLEY.

Witnesses:
 ALFRED D. BURBERY,
 H. D. JAMESON.